United States Patent [19]

MacIntyre et al.

[11] Patent Number: 5,098,024

[45] Date of Patent: Mar. 24, 1992

[54] SPRAY END EFFECTOR

[75] Inventors: James S. MacIntyre, Long Beach; Robert J. Janashak, Placentia, both of Calif.

[73] Assignee: Northrop Corporation, Los Angeles, Calif.

[21] Appl. No.: 559,870

[22] Filed: Jul. 27, 1990

[51] Int. Cl.⁵ .............................................. B05B 15/08
[52] U.S. Cl. .................................. 239/587.1; 901/22; 901/29; 901/43; 901/46; 901/47; 74/479
[58] Field of Search ................. 239/587; 901/9, 11, 901/22, 29, 43, 46, 47; 74/479, 527, 89.15, 640

[56] References Cited

U.S. PATENT DOCUMENTS

| | | | |
|---|---|---|---|
| 4,239,431 | 12/1980 | Davini | 901/43 |
| 4,283,764 | 8/1981 | Crum et al. | 901/43 |
| 4,353,677 | 10/1982 | Susnjara et al. | 901/43 |
| 4,552,504 | 11/1985 | Nakada et al. | 74/640 |
| 4,678,952 | 7/1987 | Peterson et al. | 74/640 |
| 4,818,173 | 4/1983 | Khusro | 901/47 |
| 4,821,596 | 4/1989 | Eklund | 74/479 |
| 4,827,791 | 5/1989 | Richter | 74/479 |
| 4,870,358 | 9/1989 | Glaize et al. | 901/46 |
| 4,903,539 | 2/1990 | Toyoda et al. | 74/479 |
| 4,909,098 | 3/1990 | Kiryu | 74/640 |
| 4,922,782 | 5/1990 | Kawai | 74/479 |
| 4,950,987 | 8/1990 | Vranish et al. | 901/46 |
| 4,988,259 | 1/1991 | Gabillet | 901/22 |
| 5,016,489 | 5/1991 | Yoda | 74/479 |

Primary Examiner—Andres Kashnikow
Assistant Examiner—Christopher G. Trainor
Attorney, Agent, or Firm—Terry J. Anderson; Robert B. Block

[57] ABSTRACT

A spray end effector for spray painting internal cavities of complex shapes comprising a first elongated arm having an inboard end with attachment means for coupling to a robot and also having an outboard end; a second elongated arm having an inboard end fixedly coupled to the outboard end of the first arm and also having an outboard end; a third elongated arm having an inboard end pivotally coupled to the outboard end of the second arm and also having an outboard end with a rod for supporting a spray gun rotationally coupled with respect thereto; a first air motor having a shaft rotatable about its axis located within the second arm for rotating a jack screw and longitudinally driving a threaded housing to effect the pivotal movement of the third arm with respect to the second arm; a second air motor having a shaft rotatable about its axis located within the third arm for rotating a speed reducer to effect the rotational movement of the rod with respect to the third arm; and means to effect the proper rotational positioning of the rod and spray gun with respect to the third arm and workpiece.

9 Claims, 5 Drawing Sheets

SPRAY END EFFECTOR

SPRAY END EFFECTOR
BACKGROUND OF THE INVENTION

This invention relates to a spray end effector and, more particularly, to an arm positionable at the end of a robot for supporting a spray gun and for moving the supported spray gun angularly and rotationally thereby increasing its ability to automatically spray within cavities of complex shapes.

DESCRIPTION OF THE BACKGROUND ART

There are a large number of commercially available robots on the market today. Robots are generally designed for movement in a particular manner to perform a particular task. Many robots, however, are somewhat generic in their nature, intended to provide essentially universal movements for performing essentially universal tasks. Unfortunately, there remain a large number of tasks incapable of being adequately performed by any robot on the market today.

One task incapable of being adequately performed by any known robot is the spraying of complex internal cavities. Such spraying requires the release of liquid under pressure in precise directions and in precise amounts to uniformly coat all surfaces of the internal cavity. The precise locating of the spray gun and the precise orienting of its nozzle is beyond the scope of today's robot technology. The precise positioning and spraying are of increased importance when spraying caustic solution since improper directing of the spray could damage the robotic equipment itself as well as people and/or objects in the vicinity. Further, all of the technical requirements for robots are rendered more stringent when the robotic arm is to be manipulated in small, complexly shaped spaces.

A large variety of devices and techniques for moving and manipulating robot arms are either employed commercially or are disclosed in the patent literature. Note for example, U.S. Pat. Nos. 4,688,983 to Lindbom; 4,220,170 to Hebert and 4,378,959 to Susnjara. Lindbom discloses an industrial robot having thin walled tubes constructed of a light weight composite of graphite and glass fibers. Hebert and Susnjara generally show robot arms for spraying constructed with an elbow and a wrist. Hebert shows a line actuator for elbow movement. The linear actuator is not housed within the arm inasmuch as there is no need for a compact structure since the apparatus is designed for cleaning large tanker tanks.

Pneumatic rotary indexers are disclosed in U.S. Pat. Nos. 4,430,923 to Inaba and 4,700,932 to Katsuno. Inaba discloses a robot wrist employing an air motor and limit switches in combination with pins and receptacles to provide a multiple position robot wrist. A spring member biases a positioning board toward the positioning pins. Katsuno shows pins biased by spring urged piston that act as an anti-impact safety apparatus for a robot arm.

Linear drives are disclosed in U.S. Pat. Nos. 4,059,064 to Dickey; 4,702,688 to Carlisle; 4,125,035 to Dooley; 4,511,305 to Kawai and 4,668,155 to Kaufmann. Dickey, although describing a marine autopilot, employs a linear motor drive through a ball screw mechanism to position a rudder. Integral hall effect switches are used to provide a feedback signal. Carlisle employs a linear drive for a robot arm with either an electric motor or an air motor. An encoder is described as well as ball screw and nut drive means. The arm mechanism is clearly of different designs for different motions than that of the present invention. Kawaki, Kaufmann and Dooley are of general interest. They show industrial robots having linear drive motors for moving elbows. Dooley is a spray system.

As evidenced by the great number of prior patents and commercial devices and techniques, efforts are continuously being made in an attempt to improve robots. Such efforts are being made to render such robots more efficient, reliable, inexpensive and convenient to use. None of these previous efforts, however, provides the benefits attendant with the present invention. Additionally, the prior patents and commercial devices and techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide a spray end effector comprising a first elongated portion having an inboard end coupleable to a robot arm and also having an outboard end; a second elongated portion having an inboard end fixedly coupled to the outboard end of the first portion and also having an outboard end; a third elongated portion having an inboard end pivotally coupled to the outboard end of the second portion and also having an outboard end with an attachment device; first drive means located within the second portion for effecting the pivotal movement of the third portion with respect to the second portion; and second drive means located within the third portion for effecting the rotational movement of the attachment device with respect to the third portion.

It is a further object of this invention to automatically position and manipulate a spray gun within an internal cavity with such spray gun located, and its nozzle oriented, precisely with respect to the surface to be sprayed.

It is a further object of the present invention to spray paint safely.

It is yet a further object of the present invention to accurately coat the surface of an internal cavity by the use of a spray gun movable at the end of a robot.

Lastly, it is an object of the present invention to move a spray gun angularly and rotationally, pitch and yaw, with respect to a surface to be sprayed through the use of a robot.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved spray end effector comprising a first elongated portion having an inboard end coupleable to a robot arm and also having an outboard end; a second elongated portion having an inboard end fixedly coupled to the outboard end of the first portion and also having an outboard end; a third elongated portion having an inboard end pivotally coupled to the outboard end of the second poriton and also having an outboard end with an attachment device; first drive means located within the second portion for effecting the pivotal movement of the third portion with respect to the second portion; and second drive means located within the third portion for effecting the rotational movement of the attachment device with respect to the third portion.

The first drive means includes a rotatable air motor and an axially reciprocable housing with internal threads and a jack screw secured at one end to the air motor and with external threads at the other end in engagement with the internal threads of the housing whereby rotation of the air motor will axially shift the housing. The second drive means includes a rotatable air motor and a harmonic drive coupled to the attachment device for reducing the rotational speed of the attachment device with respect to the air motor. The invention further includes a locating head rotatable with the attachment device with a plurality of dimples formed therein and an axially shiftable pin positionable in one of the dimples to ensure proper positioning of the attachment device with respect to the third elongated portion. The spray end effector further includes sensors positioned around the attachment device for verifying the rotational position thereof.

The invention may also be incorporated into apparatus for converting rotational motion of a drive member to rotational motion of a driven member in a spray end effector or the like comprising an air motor having a rotatable output shaft constituting a drive member; a harmonic drive having an input end coupled to the output shaft for rotation therewith at a first speed and an output end rotatable at a second speed, less than the first speed; a rotatable element constituting a driven member coupled to the output end of the harmonic drive; and positioning means to effect the proper rotational positioning of the driven member.

The positioning means includes a locating head rotatable with the driven member with a plurality of dimples formed therein and an axially shiftable pin positionable in one of the dimples to ensure proper positioning of the drive member with respect to the driven member. The apparatus further includes sensors positioned around the driven member for verifying the rotational position thereof. The sensors are magnetic sensors to detect the position of a magnet rotatable with the driven member. In the alternative, the sensors are optical sensors to detect the position of detents in a collar rotatable with the driven member.

Lastly, the invention may be incorporated into a spray end effector for spray painting internal cavities of complex shapes comprising a first elongated arm having an inboard end with attachment means for coupling to a robot and also having an outboard end; a second elongated arm having an inboard end fixedly coupled to the outboard end of the first arm and also having an outboard end; a third elongated arm having an inboard end pivotally coupled to the outboard end of the second arm and also having an outboard end with a rod for supporting a spray gun rotationally coupled with respect thereto; a first air motor having a shaft rotatable about its axis located within the second arm for rotating a jack screw and longitudinally driving a threaded housing to effect the pivotal movement of the third arm with respect to the second arm; a second air motor having a shaft rotatable about its axis located within the third arm for rotating a speed reducer to effect the rotational movement of the rod with respect to the third arm; and means to effect the proper rotational positioning of the rod and spray gun with respect to the third arm and workpiece.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

Figure 1:
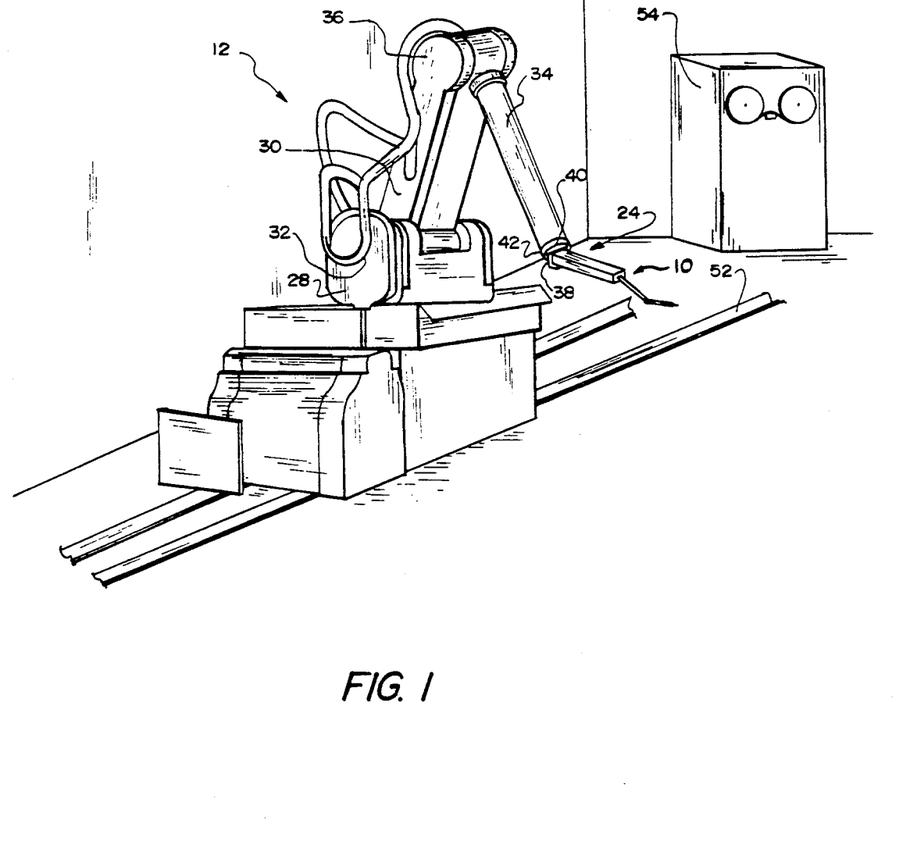
FIG. 1 is a perspective illustration of a robot which has been modified to include the spray end effector of the present invention.
Figures 2, 4:
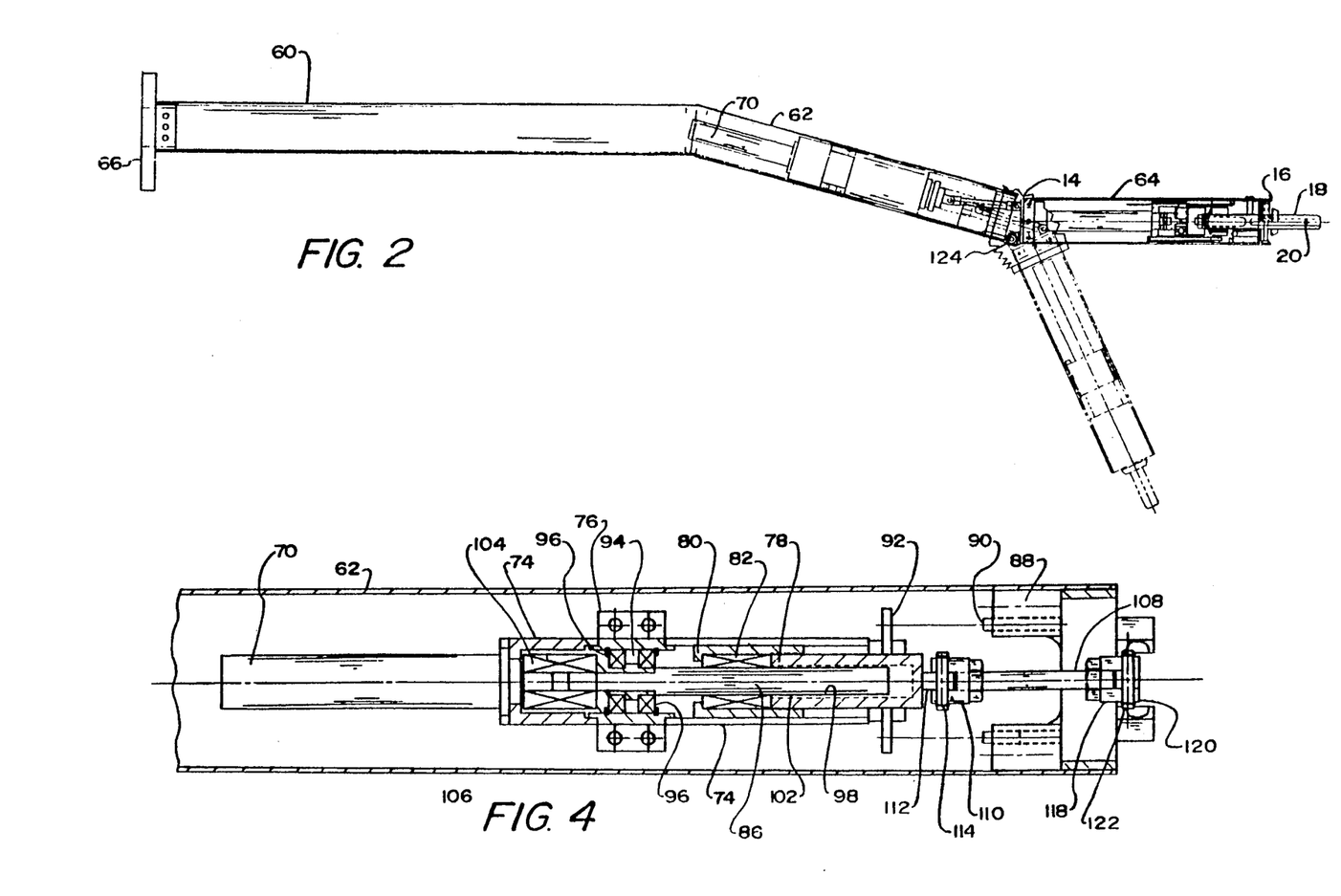
FIG. 2 is an enlarged elevational view, partly in section, of the spray end effector shown in FIG. 1.
FIG. 4 is an enlarged sectional view of the linear actuator taken through the central portion of the spray end effector shown in FIGS. 1, 2 and 3.

Shown in FIGS. 1 and 2 is the spray end effect 10 (FIG. 2 in its entirety) at the end of the commercial robot 12. The spray end effector is mounted on the robot for movement therewith in a plurality of directions. It is movable at an angle at its elbow 14 and also movable rotationally at its wrist 16. Mounted on the output shaft of the wrist is a shaft or rod 18 functioning as an attachment device and having a flat exterior end and an aperture 20 therethrough. Such aperture is adapted to have mounted thereon the tool, shown as a paint gun, from which fluid is sprayed into the cavity of the workpiece to be coated with the fluid. The paint gun has three lines extending therefrom under the control of an operator or the computerized control for the system. Two of these lines are air lines, the first for providing atomizing air under fluid to atomize the fluid to be sprayed. The second is also a small diameter flexible line to allow the off/on switching of the paint gun to initiate and terminate the spray of fluids. Lastly is a larger diameter line, also flexible, by which paint may be provided from a source to the spray gun for use when needed.

FIG. 1 shows the entire robot system 24 including a robot 12 fitted with a spray end effector 10 constructed in accordance with the principles of the present invention. The robot 12 is a commercially available unit includes a base 28 and an upstanding rectangular arm 30. The lower end of the rectangular arm is received in the base and is rotatable within a vertical plane about a lower horizontal pivot 32. The upper end of the rectangular arm receives a circular arm 34 which is also rotatable within a vertical plane about an upper horizontal pivot 36. The circular arm is rotatable about its longitudinal axis and has an elbow 38 at its outboard end. The elbow is configured for rotation about two mutually perpendicular axes of rotation 40 and 42 as indicated by the arrows.

The base of the robot is rotatable about a vertical axis 44. It is mounted on upper tracks, not shown, for linear movement with respect to a workpiece, also not shown. Beneath the base is an external indexer, which with the base 28, is mounted on lower tracks 52 for linear movement concurrent with the base. The external indexer is adapted to provide the motive force to the arms 30 and 34 and the elbow 38 in the event of a failure of its primary computerized controls 54. Such a commercially available robot is sold by GMF Robotics of Troy, Mich. under the designation of Model P-150. The computerized controls 54 may be located within the room where the spray end effector is utilized, as shown in FIG. 1, or, in the alternative, it may be located at a remote location.

FIGS. 2 through 8 illustrate in greater detail the spray end effector 10 of the present invention which is adapted to be coupled to the elbow 38 at the outboard end of the circular arm 34 of the robot. The spray end effector is formed of three portions, the inboard or first portion 60, the central or second portion 62 and the outboard or third portion 62. The inboard or first portion 60 is linear and hollow with a rectangular cross sectional configuration. It functions as a spacer for positioning the other two portions 62 and 64 and the spray gun in a proper position with respect to the circular arm 34 of the robot and the workpiece. It also functions for the passage of the pneumatic and electrical lines for effecting proper operation and control. A collar 66 at the inboard end of the first portion 60 removably couples the first portion 60 to the elbow 38 at the outboard end of the circular arm 34 of the robot 12.

Figures 3, 5:
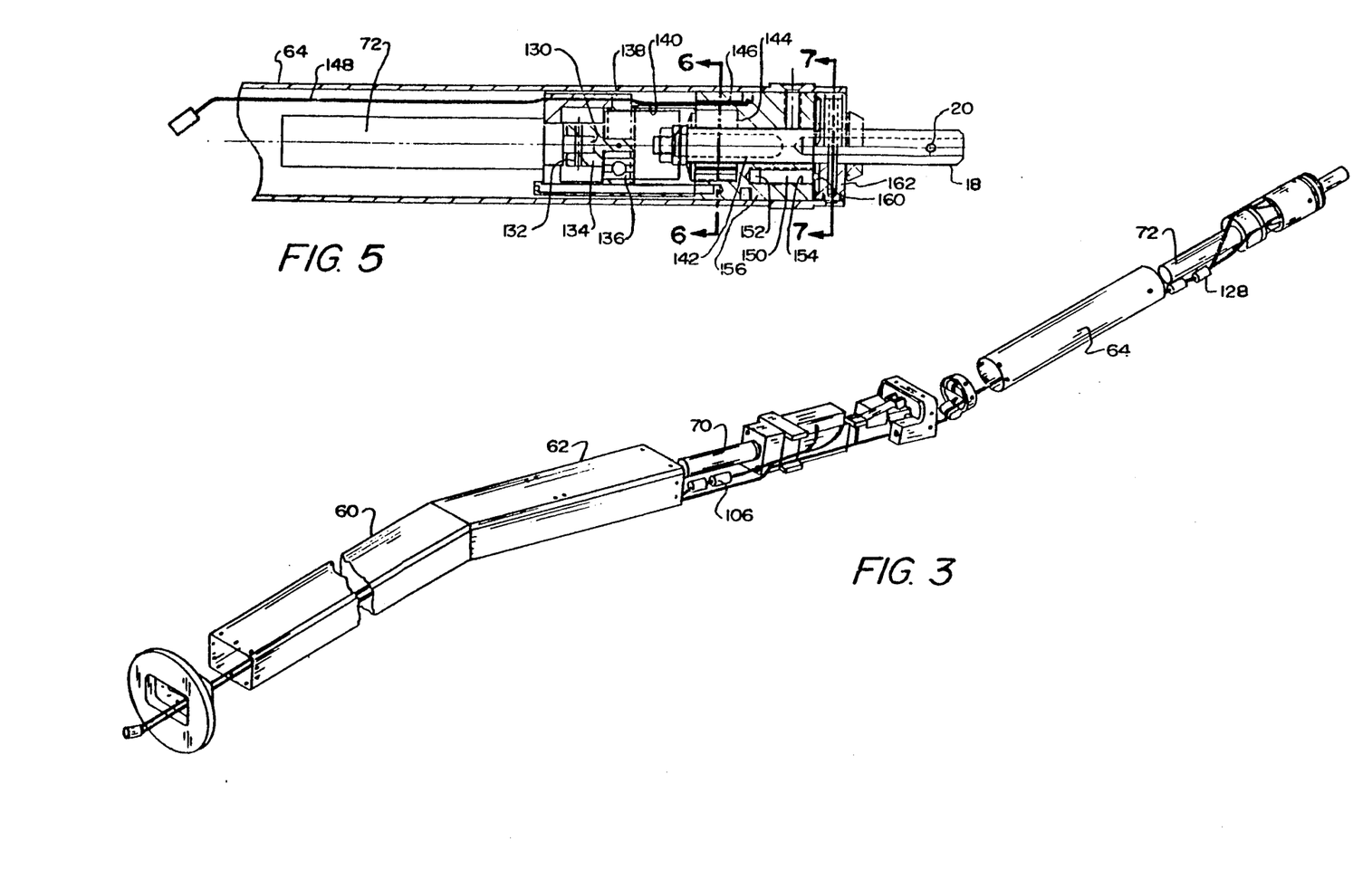
FIG. 3 is an exploded perspective illustration of the spray end effector of FIG. 2.
FIG. 5 is an enlarged sectional view of the rotary actuator taken through the outboard portion of the spray end effector shown in FIGS. 1, 2 and 3.

The central or second portion 62, like the first portion 60, is also linear and hollow with a rectangular cross sectional configuration essentially the same as the first portion 60. It also functions as a spacer for positioning the third portion 64 and the spray gun in a proper position with respect to the circular arm 34 of the robot and the workpiece and for the passage of the pneumatic and electrical lines. It is secured at its inboard end to the outboard end of the first portion 60. Such securement is at a slight angle as shown. Located within the second portion 62 is an air motor 70 and associated mechanisms for pivotally coupling the outboard end of the second portion 62 to the inboard end of the third portion 64.

The outboard or third portion 64 of the spray end effector is also linear and hollow but with a circular cross sectional configuration. It also functions as a spacer for positioning the supported spray gun at a proper position with respect to the circular arm 34 of the robot and for the passage of the pneumatic and electrical lines. Its inboard end is pivotally coupled to the outboard end of the second portion 62 while its outboard end includes the support arm 18 with its aperture 20 to which is removably coupled the spray gun. Located within the third portion 64 is a second air motor 72 and associated mechanisms for rotatably coupling the support arm 20 with respect to the third portion 62.

The first air motor 70 is located within the central or second portion of the spray end effector. Operatively associated therewith is an external cylinder 74 which is fixedly positioned by a central bracket 76. An internal housing 78 is longitudinal reciprocable within the external cylinder 74 at the outboard end. An intermediate collar 80 is fixedly positioned between the external cylinder and internal housing in a central region. Rotary bearings 82 couple the internal housing 78 and intermediate collar 80 to allow for the smooth rotation of the jack screw 86, interior thereof. An end block 88 is provided with adjustment bolts 90 to limit the longitudinal movement of the internal housing out of the external cylinder by contact with a stop surface 92 mounted on the internal housing 78 for longitudinal reciprocation therewith.

Locknuts are positioned on opposite sides of stop surface 92 for adjusting the position of the arm or third portion 64 in its "up" position, the solid line showing of FIG. 2. Adjustment bolts 90 are then adjusted to position third portion 64 in the proper "down" locations, the dotted line showing of FIG. 2. Driving against these stops eliminates any slop or backlash in the actuator, and the tip 20 is positionally more repeatable, accurate and rigid.

Extending the length of the external cylinder is the centrally positioned jack screw 86. An enlarged central collar 94 receives a pair of circular bearing assemblies 96 at an intermediate region of the central portion. This arrangement, in association with the rotary bearings 82, allows for the smooth rotation of the jack screw during operation and use. The outboard end of the jackscrew 86 is formed with external threads 98 in mating engagement with internal threads 102 in the internal housing 78. The inboard end of the jack screw 86 is coupled through a flexible coupling 104 to the rotatable end 106 of the air motor 70 which is located in the inboard end of the second portion 62. This arrangement allows for the concurrent rotational movement of the air motor 70 and jack screw 86 to be translated by the mating threads 98 and 102 into linear movement of the internal cylinder 78.

Rotational movement of the jack screw 86, in one direction or the other, is effected by the the introduction of air under pressure by a selected one of the air lines into an appropriate orifice of the air motor in the conventional manner. The introduction of pressurized air into the air motor, as well as its stoppage, is effected by electrically operated valves 104 as directed through the computerized controls of the system.

A connecting rod 108 couples the third portion 64 of the spray end effector 10 to the second portion 62 for pivotal movement therebetween. A drive clevis 110 on the inboard end of the connector rod 108 couples to an extension 112 at the outboard end of the internal cylinder 78 through a pivot pin 114. A driven clevis 118 on the outboard end of the connector rod 108 couples to a fixed block 120 at the upper extent of the third portion 64 at its inboard end through a pivot pin 122. With a hinge pin 124 coupling the second and third portions 62 and 64 at their lower extents, linear motion of the internal cylinder is translated into rotational motion of the third portion. The present configuration allows for a full 60 degree pivoting of the third portion 64 with respect to the second portion 62 along with the concurrent movement of the spray gun.

Located within the third portion 64 of the spray end effector 10 is a second air motor 72. Rotational movement of the air motor 72, in one direction or the other, is effected by the the introduction of air under pressure by a selected one of the air lines into an appropriate orifice of the air motor 72 in the conventional manner. The introduction of pressurized air as well as its stoppage is effected by electrically operated valves 128 as directed through the computerized controls of the system.

The second air motor 72 and other associated mechanisms are located within the housing for the third portion of the spray end effector 10. On the outboard end of the air motor 72 is an air motor shaft 130 coupled by a pin 132 to a rotating clevis 134, rotatable therewith. The outboard end of the clevis is of a reduced diameter for being press fit into the inner race of a ball bearing assembly 136. The outer race of the ball bearing assembly is press fit into a harmonic drive 138 whereby rotation of the air motor shaft 130 at a rapid rate of rotation will be translated into rotation of the rotatable spacer tube 140, rotatable with a rotational speed reducer, harmonic drive 138, but at a slower rotational speed. Rotation of the spacer tube 140, in turn, rotates the drive shaft 142 for rotating the support shaft 18 and paint gun. Motors of this type with internal gearing for a particular purpose are presently commercially available.

Figure 6:
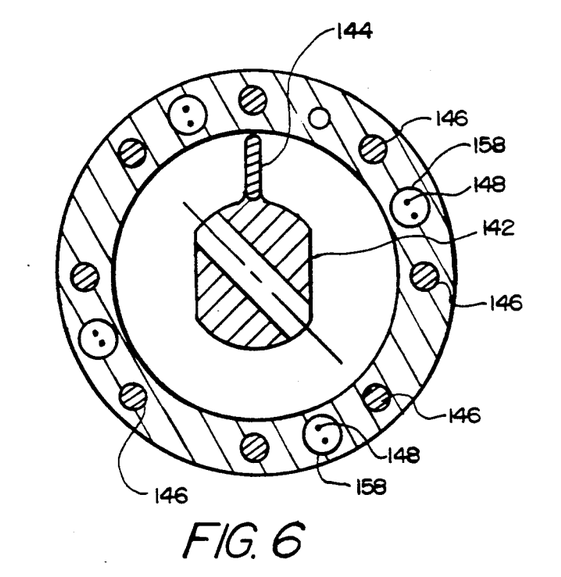
FIG. 6 is a sectional view taken through line 6—6 of FIG. 5.
Figure 7:
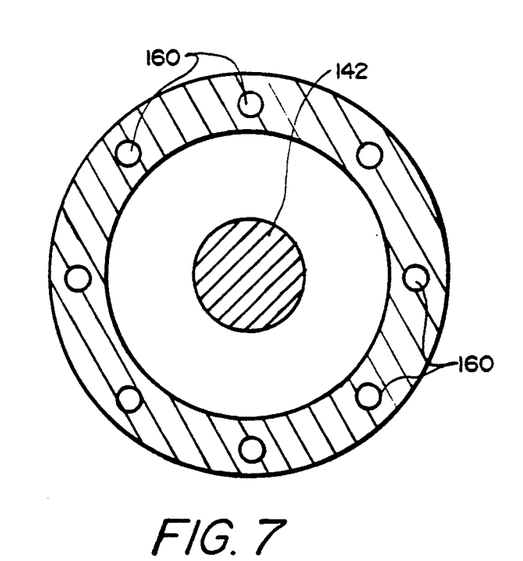
FIG. 7 is a sectional view taken through line 7—7 of FIG. 5.

Mounted for rotation on the drive shaft 142 is a magnet carrier with a single magnet 144 rotatable therewith. Fixedly mounted exteriorly of the magnet carrier in a cylindrical collar are a plurality of sensors 146. In the preferred embodiment, eight such sensors are located peripherally around the magnetic magnet carrier at equally spaced intervals of 45 degrees so as to determine the location of the magnet 144 and drive shaft 142 at any one of a plurality, preferrably eight, such positions. An electrical sensor 146 reads from the appropriate sensor with an adjacent magnet 144 the location of the magnet 144 and hence the orientation of the drive shaft 142 and paint gun for proper operation and control. Such sensors could be read switches, or the like, but optical sensors have been found to be preferred. Hall Effect sensors also work well. Lines 148 extend through apertures 158 in the fixed collar to couple the sensors 146 to the controller. Additional holes are also provided in the cylinder 156 for belts to insure against movement.

Figure 8:
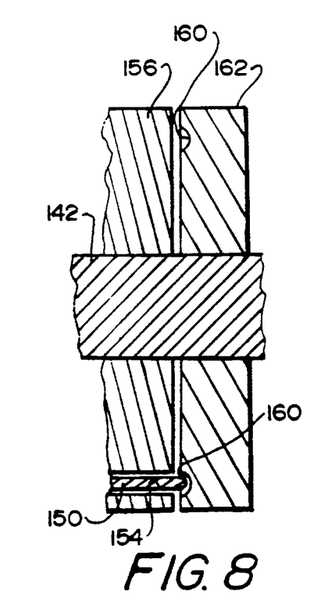
FIG. 8 is a sectional view taken along line 8—8 of FIG. 7.

Manual indexing by the operator of the rotational orientation of the drive shaft and paint gun is accomplished by a pin 150, loaded by a spring 152, in an axial recess 154 of the fixed head cylinder 156. The projection of the pin 150 extends axially in an outboard direction for being received in one of eight equally spaced detents 160 in a locating head 162 mounted for rotation with the drive shaft 142. In this manner, the exact rotational orientation of the drive shaft 142 and paint gun with respect to the spray end effector can be assured. The sensors and pin detent arrangement thus effect and verify the proper rotational positioning of the rod and spray gun with respect to the third portion and workpiece.

Figure 9:
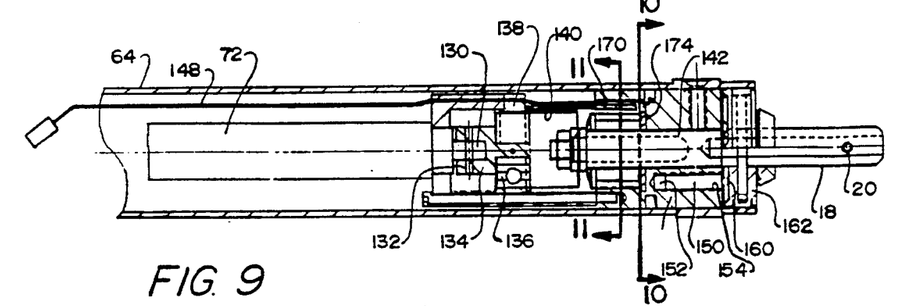
FIG. 9 is a sectional view similar to FIG. 5 but showing an alternate embodiment of the invention.
Figure 10:
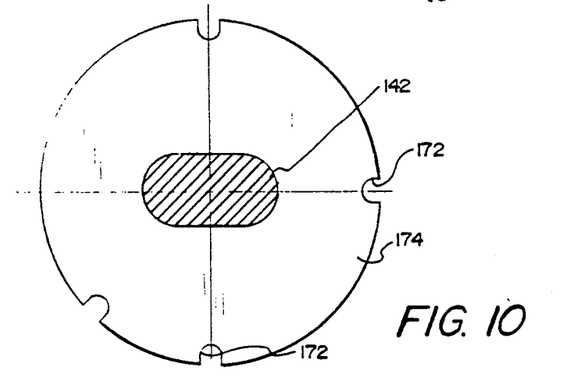
FIG. 10 is a sectional view taken through line 10—10 of FIG. 9.
Figure 11:
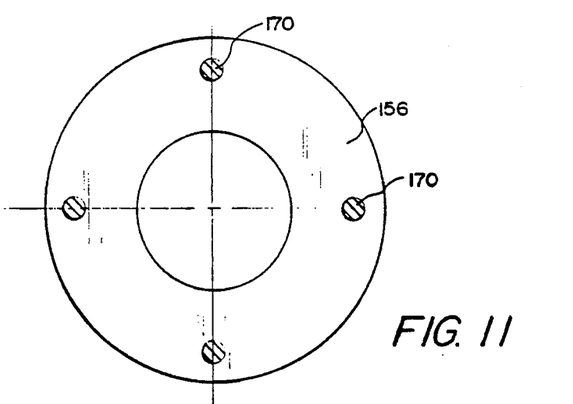
FIG. 11 is a sectional view taken through line 11—11 of FIG. 9.

In an alternate embodiment of the invention, as well as the external indexer 54, the magnet 144 and magnetic sensors 146 are replaced by fiber optic sources 170 functioning as sensors in association with recesses 172 in a rotatable disk 174 secured with respect to the shaft 142.

Four fiber optic light sources 170 are positioned every ninety degrees (90°) around the air motor 72 and are stationary in the fixed head cylinder 156. The rotatable disk 174 is circular and functions as a fiber optics plate. In the center is a slot which couples the plate to the shaft 142. As the air motor 72 rotates the shaft 142, the fiber optic plate rotates along with it.

In the fiber optic plate there are four half circle, cut outs, or recesses 172 located at 0 degrees, 90 degrees, 180 degrees, and −120 degrees. The fiber optic plate has been polished, so that it will reflect light. As the air motor rotates the fiber optic plate, the cut outs will pass in front of the fiber optic light. If the light is reflected back into the fiber optic light source, no cut out, the end effector controller 54 will interpret this as an "on" signal. If a cut out is present then the opposite is true, and the signal will be "off". By reading the condition of each of the four fiber optic sources a table as shown below can be used to determine the position of the shaft and spray gun.

| Position | Condition of Fiber Optic Light | | | |
| --- | --- | --- | --- | --- |
| | 1 | 2 | 3 | 4 |
| 0° | Off | Off | Off | On |
| 45° | On | On | On | Off |
| 90° | On | Off | Off | Off |
| 120° | Off | On | On | On |
| 180° | Off | On | Off | Off |
| −120° | On | Off | On | On |
| −90° | Off | Off | On | Off |
| −45° | On | On | Off | On |

In this manner, the controller 54 can verify the orientation of the spray gun through the optical sensors of the second embodiment or the magnetic sensors of the first embodiment.

The skeletal structure of the first, second and third portions of the robot is preferably of a composite graphite. Such material provides the required rigidity and strength while maintaining the overall weight at a minimum. Such is highly desirable, particularly due to limitations of wrist strength of the robot. The skeletal structure, in combination with high quality materials of the inside componentry, facilitates corrosion resistance to provide a long and dependable life to the robot. In addition, the selected skeletal materials, in combination with the selected inside componentry, such as the pneumatic actuators with low current electronic feedback sensors, adds to the safety of the robot which is intended for use in an explosive vapor environment.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. A spray end effector for spray painting internal cavities of complex shapes comprising:
    a first elongated arm having an inboard end with attachment means for coupling to a robot and also having an outboard end;
    a second elongated arm having an inboard end fixedly coupled to the outboard end of the first arm and also having an outboard end;
    a third elongated arm having an inboard end pivotally coupled to the outboard end of the second arm and also having an outboard end with a rod for supporting a spray gun rotationally coupled with respect thereto;
    a first air motor having a shaft rotatable about its axis located within the second arm for rotating a jack screw and longitudinally driving a threaded housing to effect the pivotal movement of the third arm with respect to the second arm;
    a second air motor having a shaft rotatable about its axis located within the third arm for rotating a speed reducer to effect the rotational movement of the rod with respect to the third arm; and
    means to effect the proper rotational positioning of the rod and spray gun with respect to the third arm and workpiece.

2. A spray end effector comprising:
    a first elongated portion having an inboard end coupleable to a robot arm and also having an outboard end;
    a second elongated portion having an inboard end fixedly coupled to the outboard end of the first portion and also having an outboard end;
    a third elongated portion having an inboard end pivotally coupled to the outboard end of the second portion and also having an outboard end with an attachment device;
    first drive means located within the second portion for effecting the pivotal movement of the third portion with respect to the second portion; and
    second drive means located within the third portion for effecting the rotational movement of the attachment device with respect to the third portion;
    said second drive means including a rotatable air motor and a harmonic drive coupled to the attachment device for reducing the rotational speed of the attachment device with respect to the air motor.

3. The spray end effector as set forth in claim 2 wherein the first drive means includes a rotatable air motor and an axially reciprocable housing with internal threads and a jack screw secured at one end to the air motor and with external threads at the other end in engagement with the internal threads of the housing whereby rotation of the air motor will axially shift the housing.

4. The spray end effector as set forth in claim 2 and further including a locating head rotatable with the attachment device with a plurality of dimples formed therein and an axially shiftable pin positionable in one of the dimples to ensure proper positioning of the attachment device with respect the third elongated portion.

5. The spray end effector as set forth in claim 4 and further including sensors positioned around the attachment device for verifying the rotational position thereof.

6. For use in a spray end effector, or the like, apparatus for converting rotational motion of a drive member to rotational motion of a driven member comprising:
    an air motor having a rotatable output shaft constituting a drive member;
    a drive having an input end coupled to the output shaft for rotation therewith at a first speed and an output end rotatable at a second speed, less than the first speed;
    a rotatable element constituting the driven member coupled to the output end of the drive; and
    positioning means to effect the proper rotational positioning of the driven member;
    said positioning means including a locating head rotatable with the driven member with a plurality of dimples formed therein and an axially shiftable pin positionable in one of the dimples to ensure proper positioning of the driven member with respect to the drive.

7. The apparatus as set forth in claim 6 and further including sensors positioned around the driven member for verifying the rotational position thereof.

8. The apparatus as set forth in claim 7 wherein the sensors are magnetic sensors to detect the position of a magnet rotatable with the driven member.

9. The apparatus as set forth in claim 7 wherein the sensors are optical sensors to detect the position of detents in a collar rotatable with the driven member.

* * * * *